United States Patent
Chen et al.

(10) Patent No.: US 11,245,732 B2
(45) Date of Patent: Feb. 8, 2022

(54) METHOD AND DEVICE FOR THE MODULAR ORIENTATION OF AN AVB STREAM

(71) Applicant: SIEMENS AKTIENGESELLSCHAFT, Munich (DE)

(72) Inventors: Feng Chen, Feucht (DE); Franz-Josef Götz, Heideck (DE); Marcel Kiessling, Velden (DE); An Ninh Nguyen, Nuremberg (DE); Jürgen Schmitt, Fürth (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/492,601

(22) PCT Filed: Mar. 10, 2017

(86) PCT No.: PCT/EP2017/055643
§ 371 (c)(1),
(2) Date: Sep. 9, 2019

(87) PCT Pub. No.: WO2018/162071
PCT Pub. Date: Sep. 13, 2018

(65) Prior Publication Data
US 2020/0382564 A1    Dec. 3, 2020

(51) Int. Cl.
*H04L 29/06* (2006.01)
*H04L 12/727* (2013.01)

(52) U.S. Cl.
CPC ........ *H04L 65/1073* (2013.01); *H04L 45/121* (2013.01); *H04L 65/608* (2013.01)

(58) Field of Classification Search
CPC .. H04L 65/1073; H04L 45/121; H04L 65/608
See application file for complete search history.

(56) References Cited

U.S. PATENT DOCUMENTS

2006/0268903 A1    11/2006  Feng
2008/0235699 A1*   9/2008   Jeong ................ H04L 47/70
                                                    718/104
(Continued)

FOREIGN PATENT DOCUMENTS

CN    101668317 A    3/2010
CN    102238107 A    11/2011
(Continued)

OTHER PUBLICATIONS

PCT International Search Report and Written Opinion of International Searching Authority dated Nov. 8, 2017 corresponding to PCT International Application No. PCT/EP2017/055643 filed Mar. 10, 2017.

(Continued)

*Primary Examiner* — Kevin C. Harper
*Assistant Examiner* — Derrick V Rose
(74) *Attorney, Agent, or Firm* — Lempia Summerfield Katz LLC

(57) ABSTRACT

The invention relates to methods and to a device for the modular orientation of an AVB stream. The introduction of a new attribute (L_BRIDGE) into the reservation protocol that has been further developed for TSN allows to better use the existing mechanisms in the Ethernet Standard. To this end, each receiver and each transmitter has to announce himself in the network (already existing for the transmitters).

13 Claims, 5 Drawing Sheets

(56) References Cited

U.S. PATENT DOCUMENTS

| | | | |
|---|---|---|---|
| 2011/0173330 A1 | 7/2011 | Gong et al. | |
| 2011/0276637 A1 | 11/2011 | Thornton et al. | |
| 2012/0026951 A1 | 2/2012 | Mace | |
| 2012/0314597 A1 | 12/2012 | Singh | |
| 2014/0022938 A1 | 1/2014 | Olsen | |
| 2015/0319077 A1* | 11/2015 | Vasseur | H04L 43/0852 370/238 |
| 2015/0326493 A1 | 11/2015 | Mace | |
| 2015/0372907 A1 | 12/2015 | Korhonen et al. | |
| 2016/0149979 A1* | 5/2016 | Farkas | H04L 65/601 709/226 |
| 2017/0222934 A1 | 8/2017 | Ye | |
| 2019/0386935 A1* | 12/2019 | Back | H04L 41/0816 |

FOREIGN PATENT DOCUMENTS

| | | |
|---|---|---|
| CN | 104620550 A | 5/2015 |
| CN | 105306245 A | 2/2016 |
| CN | 105684362 A | 6/2016 |
| GB | 2488120 A | 8/2012 |
| KR | 20060113383 A | 11/2006 |
| KR | 20110122128 A | 11/2011 |
| WO | WO2010094595 A1 | 8/2010 |

OTHER PUBLICATIONS

Korean Office Action for Korean Application No. 10-2019-7029591 dated Aug. 14, 2020.

Indian Office Action for Indian Patent Application No. 201937035911 dated Jan. 14, 2021.

Chinese Office Action for Chinese Application No. 201780088207.0 dated Apr. 27, 2021.

Chinese Office Action for Chinese Application No. 2017800882070 dated Nov. 30, 2021, with English translation.

* cited by examiner

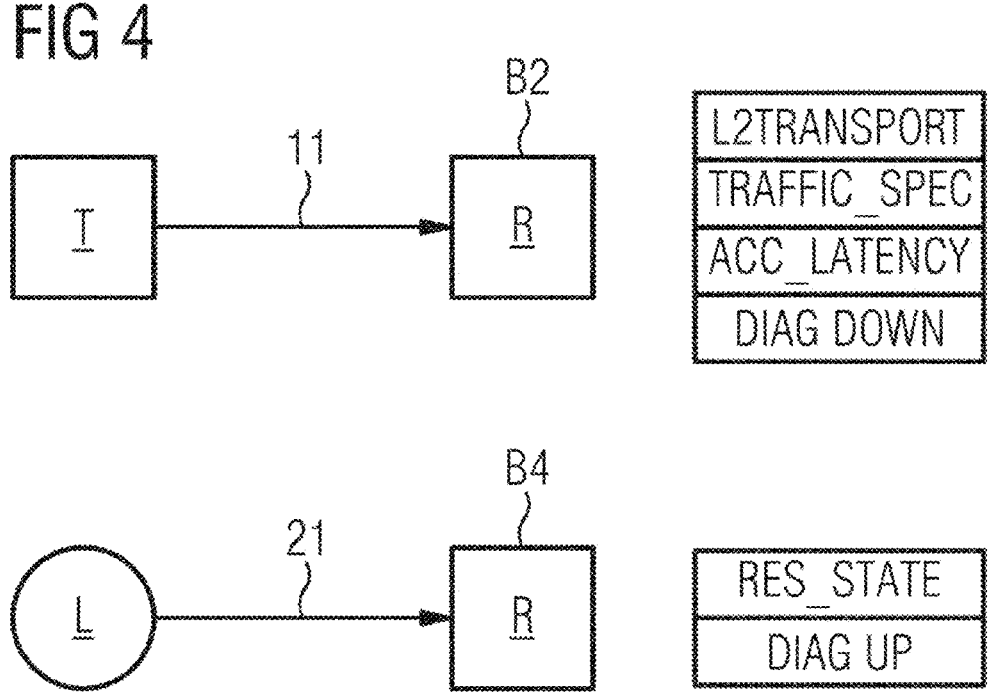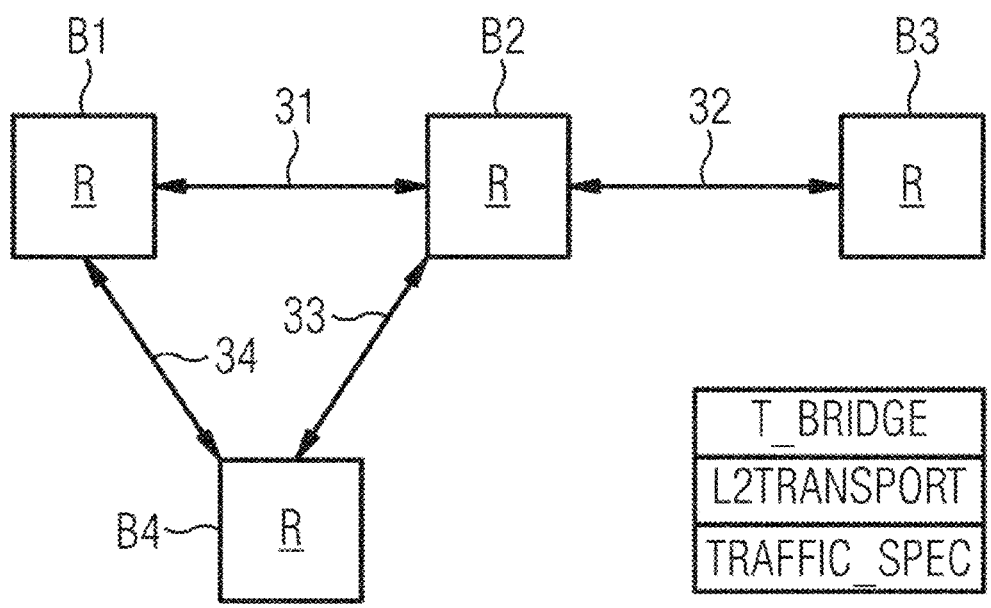

METHOD AND DEVICE FOR THE MODULAR ORIENTATION OF AN AVB STREAM

This application is the National Stage of International Application No. PCT/EP2017/055643, filed Mar. 10, 2017. The entire contents of this document are hereby incorporated herein by reference.

BACKGROUND

Real-time communication in standardized Ethernet networks is made possible by virtue of the expansions of the IEEE working group TSN (Time Sensitive Networking, IEEE 802.1). To configure the network, a reservation protocol is used (Message Session Relay Protocol, MSRP, RFC 4975), which concerns the necessary setup of the connections (e.g., streams) and the use of resources.

The TSN working group has further developed the results of the AVB working group. The reservation protocol was developed in AVB (audio/video bridging, IEEE 802.1; defined for use in home networks).

A redundancy functionality of the network was not considered; a possible changeover of paths always led to the complete breakdown of all of the active streams in the network. There was only a single active connection in the whole network; redundant connections are typically not present in home networks. The reservation protocol dealt with the setup of the streams and the configuration of the network. Information about the available streams is forwarded to all of the terminals. This is necessary since the available resources are checked beforehand.

Previous redundancy approaches in the industrial environment (e.g., ring redundancy) are able to be used only in special networks and do not consider the local configuration, required for the stream setup, of the network components.

Up until now, all of the terminals have to be able to receive all of the stream information. A simpler implementation in terminals reduces the memory requirement in order to buffer-store the information that is not required, but the packets still have to be received and evaluated. In AVB, the terminals are to be powerful. Due to the previous design of the protocol, the number of packets to be processed in this case is limited.

With an increasing number of streams, a higher network load arises in simple network participants. In industrial applications, however, the terminals are to be as inexpensive as possible, and a main task is not to transmit data but to acquire and evaluate physical measured values. Very simple terminals are thus not possible.

Industrial applications are based on the processing of a plurality of measured values that are transmitted in separate streams and the resultant driving of actuators, likewise a plurality of streams, to a plurality of devices. The location of the various terminals is generally concealed by the network; the required transmission time of the individual connections, due to the reservation protocol, is, however, known only to the receiver of the message following a successful reservation.

A plurality of applications in a network increases the number of streams, but terminals receive all of the stream information.

The requirement for high availability has up until now not been sufficiently considered. A targeted changeover of connections by local knowledge is not possible using the known methods.

In the known procedure, there continues to be a restriction in terms of the maximum number of streams supported in the network, since the protocol is able to synchronize only a limited amount of data.

In the case of use in industrial networks, there are in this case, in addition to the number of streams, also additional requirements.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a method for use in the industrial sector with the following requirements is provided.

The method may be used for simple terminals with little memory. The applications in this case use data from many IO devices (e.g., many streams); the transmission time of all of the streams is likewise decisive (e.g., the time interval from the beginning of the transmission until the end, makespan).

A plurality of applications in the overall network having a very large number of connections may be supported.

The connections have a high availability.

The method describes the guidance of a stream along a reserved path in a network based on the Time-Sensitive Networking standard in accordance with IEEE 802.1, where the reservation procedure to create a path in the network is performed in a modular manner in that, in a first act, the registration of the transmitter is transmitted by a Talker Advertise message only to the first reachable network element of the network and is stored there. The registration of the receiver is transmitted by a Listener Ready message to a second reachable network element and is stored there, and in a second act, a path is reserved between the first network element and the second network element based on the previously stored information.

The insertion of a new attribute (L_BRIDGE) in the reservation protocol developed further for TSN makes it possible to better use the existing mechanisms in the Ethernet standard. For this purpose, each receiver and each transmitter (until now already present for transmitters) identify themselves in the network.

All of the information required for the reservation is stored in a database. These databases are situated in the bridges. The database is divided into a central memory and into respective port databases for the respective talker/transmitter and listener/receiver directions.

Data packets (TLVs) without an indication of direction are in this case stored in the central memory together with the last-seen packet sequence number (e.g., stream ID) of the attribute.

Data packets (e.g., TLVs) with an indication of direction are stored on the receiving port in a reception database and on the transmitting port in a transmission database. The attribute L_REGISTRATION is in this case new.

The receiver thus transmits first information about the position of the receiver in a Listener Ready message, such that a path reservation is able to perform a reservation and path setup using second information in relation to the position of the transmitter in the network.

In a further configuration, further information is contained in the Talker Advertise message and/or the Listener Ready message about the maximum permissible latency time (REQ_LATENCY).

The path is reserved based on the latency times and/or transmitted in the message, as accumulated information about the latency time (ACC_LATENCY).

The path determination is based on the best route from the point of view of the respectively required transmission times between the individual network elements.

The receiver may register with the nearest network element with a stream, identified by stream ID, in order to receive further data (e.g., stream descriptions) from the network element.

As an alternative, the receiver may also register with the network element with a stream such that the receiver receives only further registered data from the network element. This has the advantage that actually only relevant information is transmitted, which reduces the network load and also the capacity of the listener with regard to the evaluation of the received information.

The receiver then receives only the information relevant to the receiver communicated by the network.

In the event of other information changing, the receiver is for the first time not notified at all.

Bridges up until now disclose a similar mechanism (e.g., "pruning"), in which information is forwarded in a targeted manner only in the network portion on which the transmission is possible. The new functionality (e.g., "listener pruning") allows the targeted forwarding of relevant information to terminals that are interested in receiving the data (e.g., the stream).

The network components may use the registration information to forward only relevant data and subsequent changes to these data to the terminals (e.g., "listener pruning"). As a result, the scope of the information and the accompanying number of packets is reduced. This leads to a lower computational load in the terminals. Simple terminals are thereby also able to be used in relatively large networks; considerably more streams may be used in the network.

BRIEF DESCRIPTION OF THE DRAWINGS

FIG. 4 shows one embodiment of a modular Talker Advertise and Listener Ready reservation procedure;

FIG. 5 shows an exemplary distribution of global information from the Talker Advertise and Listener Ready to all of the network elements;

DETAILED DESCRIPTION

Figure 8:
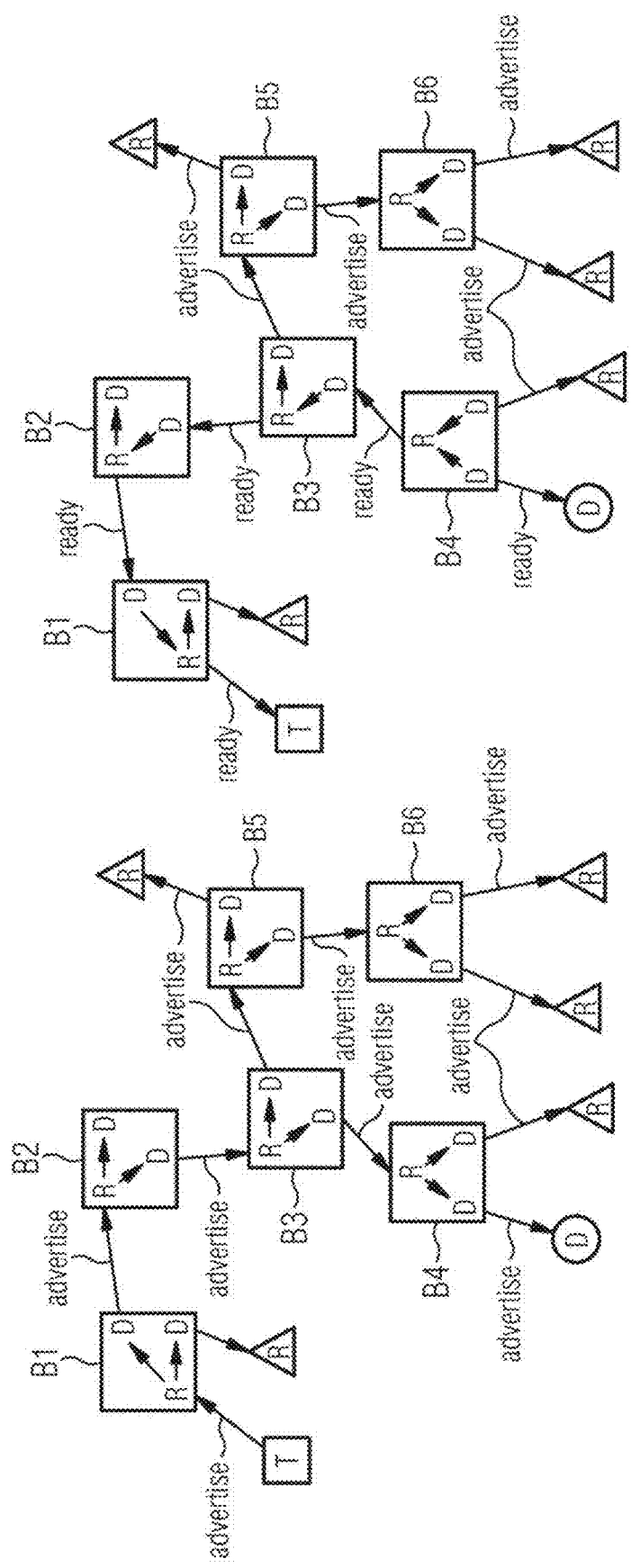
FIG. 8 shows an overall view of a procedure of the method shown in FIGS. 1 to 3.

FIG. 8 shows an AVB reservation procedure of a stream in a network as takes place in accordance with the procedure up until now. B1 to B6 are intermediate network elements (e.g., bridges). T denotes the transmitter (e.g., the talker). L shows the listener station (e.g., the addressed receiver). In a first act, information is sent to everyone via the advertise, and the registration and declaration take place in the bridge. The listener station returns a Ready message in response, which provides that the respective path is reserved.

Figure 1:
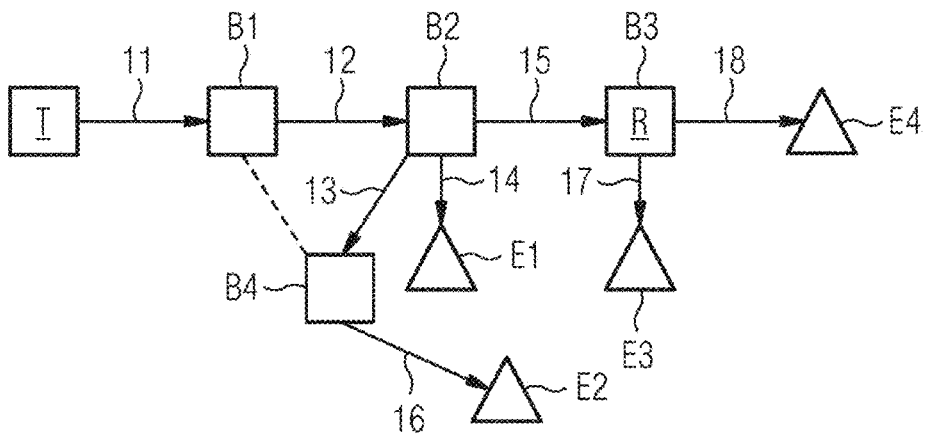
FIG. 1 shows a Talker Advertise, a successful reservation in the known AVB.
Figure 2:
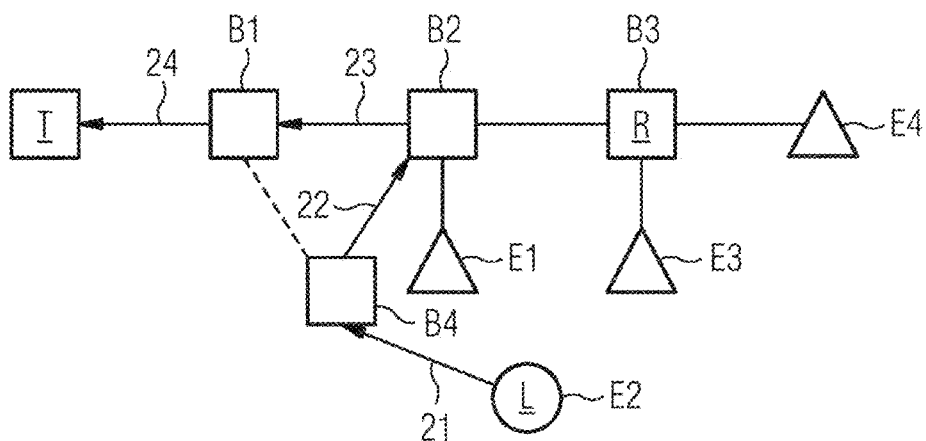
FIG. 2 shows a Listener Ready, a reservation confirmation.
Figure 3:
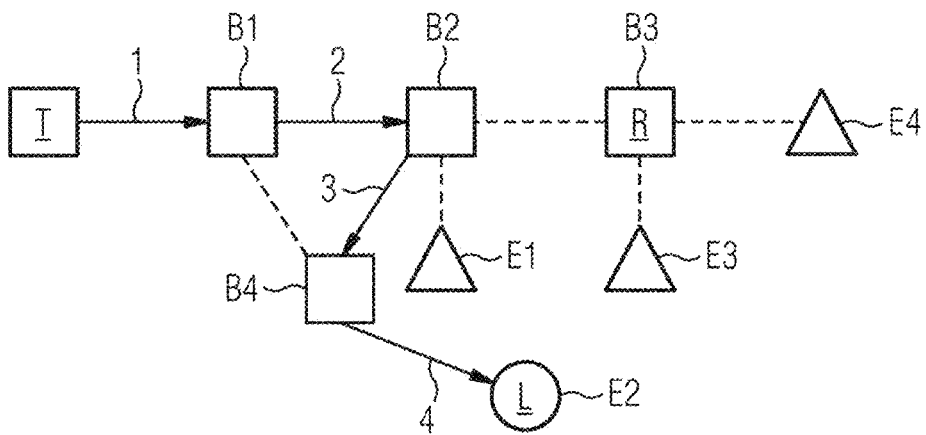
FIG. 3 shows the communication on a path set up in this way.

FIGS. 1 to 3 describe the alternative reservation procedure to FIG. 8 using an RSTP root bridge R. The network elements/bridges B1 to B4 are connected to one another via, in part, several alternative routes. Terminals E1 to E4 are connected, a bridge B3 is configured as an RSTP root bridge R that performs the path determination in the network. The Talker Advertise is distributed by various network elements 11 to 18 over the network, such that each terminal is reached. FIG. 2 illustrates that the addressed receiver/listener, the terminal T2, transmits its Listener Ready message to the next connected bridge B4, 21. From there, the Listener Ready message is not, however, transmitted back to the transmitter/talker, as in the procedure described in FIG. 8, but rather the Listener Ready message "waits" there for the next Talker advertise. FIG. 3 then shows the communication over the reserved path, 1 to 4.

FIG. 4 again explains the modular sequence of the reservation. The transmitter, talker T, transmits 11 a message to the first network element B2. The message is stored at the first network element B2, R. The first network element B2 receives the information illustrated in the box, about L2TRANSPORT, TRAFFIC_SPEC, ACC_LATENCY and DIAG DOWN.

In the same way, the transmitter/listener L likewise transmits 21 a message to the next network element B4 for storage R. This contains the information RES_STARE and DIAG UP.

In the second act, the stored information from the Talker Advertise and the Listener Ready is then transmitted to all of the network elements B1 to B4 for storage R, 31, 32, 33, 34. T_BRIDGE generates the talker information, and L_BRIDGE generates the listener information.

By way of example, the message T_BRIDGE is listed. This contains the information L2TRANSPORT and TRAFFIC_SPEC.

Figure 6:
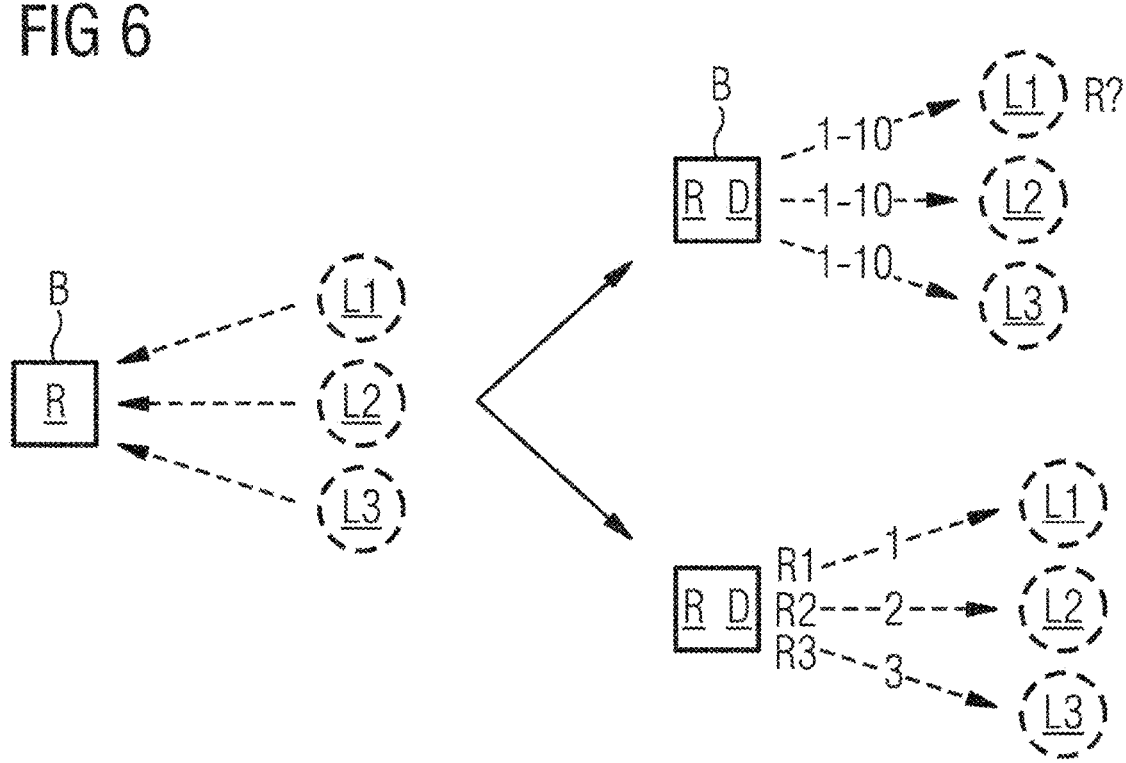
FIG. 6 illustrates listener pruning.

FIG. 6 depicts, by way of example, the configuration of the information distribution to the receiver. The receivers L1, L2 and L3 propagate information (e.g., stream descriptions) to the nearest network element B. Normally, this information 1-10 (e.g., new information) is all transmitted back to all of the receivers/listeners in unfiltered form. If the variant in which filtering is performed is now selected, then the respective listeners L1, L2, L3 register themselves or their stream with the network element, R1, R2, R3. Only registered information is then forwarded, as in the case of listener registration along talker registration.

Figure 7:
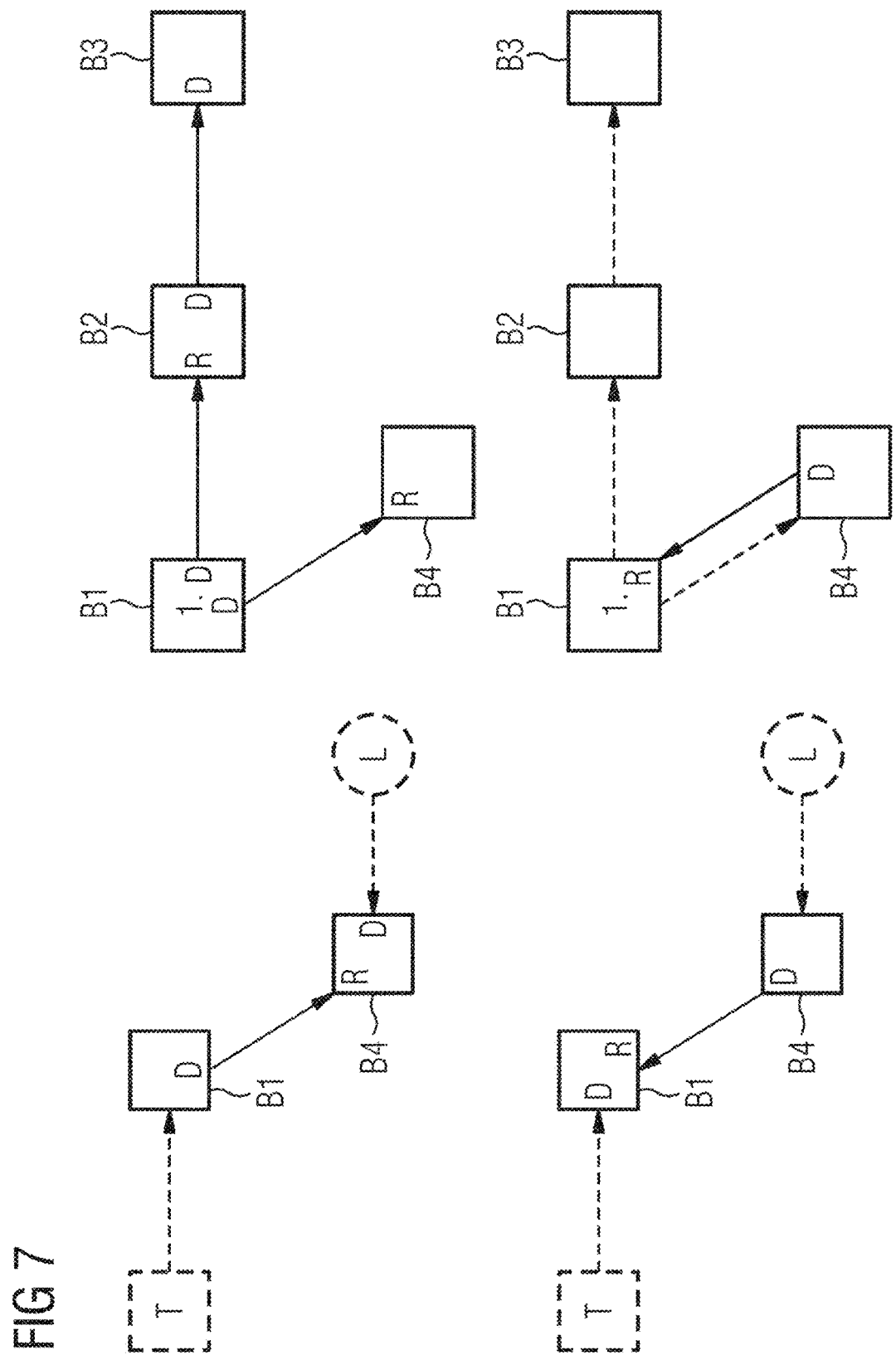
FIG. 7 shows various implementation options for the path setup in the network according to an embodiment.

FIG. 7 once again shows the path setup in the network for the stream.

In the case of a local setup, as described up until now, the stream description (L2TRANSPORT) together with the position of the listener (L_BRIDGE) and the position of the talker (T_BRIDGE) is combined in the network, and the assignment of the stream on the path, the local configuration of the FDB, is obtained.

The latency time from the talker to the listener is accumulated on the path. As an alternative (top right), the forwarding takes place on the path from the talker bridge B1 to all of the other bridges B2, B3 and B4.

The bottom left illustrates how the reservation status is transmitted from the listener to the talker, given by the information T_BRIDGE. D in this case stands for declaration, and R stands for reservation, in the same way as for the illustration of FIG. 8.

The bottom right then shows a further alternative, where the path has been determined using latency addition.

Overall, the described procedure, in addition to the advantages already described, displays even more advantages.

The overall transmission time is able to be optimized. Frames may initially be sent to remote devices with a plurality of hops in the network. These are even transmitted when frames still have to wait on devices that are close by. The makespan is also thereby able to be optimized. By shortening the times, relatively stringent requirements in the industrial environment are also met.

When using the Time Aware Shaper (TAS), locally optimizing the transmission order in the controller (e.g., programmable logic controller or PLC in an industrial installation) is generally sufficient to optimize the entire communication. When using TAS, network resources are reserved exclusively for the transmission and are not able to be used for other applications. By virtue of the local optimization, the required TAS window is able to be reduced, and the exclusively used bandwidth may be configured in a more optimum manner. This makes it possible to use the bandwidth for other applications or a larger number of connections in the same window.

The use of further-developed routing mechanisms in the Ethernet is made possible. Via the known location of the receivers (e.g., listeners), it is possible to use, for example, a shortest path bridging (SPB) algorithm in order to find the respective shortest path for a transmission. The latency when setting up a stream is thereby optimized.

In the event of a fault, knowledge about the location of the terminals may be used to implement a local changeover. This is called, for example, "fast reroute" in IP. Each bridge may decide, by way of the topology knowledge that is present (e.g., by IS-IS, intermediate system to intermediate system in SPB), whether, when the streams change, forwarding to the same port should still be performed or another alternative should be used in order to still allow the transmission. High availability of the streams in the network is achieved using standardized mechanisms.

Reservations may also be adjusted locally in the case of changes to the topology, which speeds up the changeover of stream paths.

Via the registration of the terminals and the use of the existing topology information, it is possible to optimize the order of the data locally in the transmitter (e.g., PLC in the industrial environment) in order to shorten the makespan. Smaller application cycles thereby become possible.

The method, also referred to as fast reroute, is based on topology knowledge and the identification of the participants in a connection. The new forwarding may be calculated and directly responded to locally. Communication between adjacent network components is not necessary. A significantly faster changeover is thereby made possible.

In industrial networks, the application defines the required connections. As a result, the required connection identifiers, stream IDs, are known in the case of transmitter and receiver. By virtue of the registration before the reception of stream information, only relevant information is forwarded.

The use of simpler and therefore less expensive terminals is possible even in large networks, since the resource requirement in network components becomes lower through the use of simpler network components, or else in order to operate a plurality of applications in the network.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for guiding a stream, by an intermediate network element, along a reserved path in a network based on the Time-Sensitive Networking standard in accordance with IEEE 802.1, wherein a reservation procedure to create a path in the network by the intermediate network element is performed in a modular manner, the method comprising:
   transmitting, in a Talker Advertise message by a transmitter, registration of the transmitter only to a first reachable network element of the network, and storing the registration of the transmitter at the first reachable network element;
   transmitting, in a Listener Ready message by a receiver, a registration of the receiver only to a second reachable network element, and storing the registration of the receiver at the second reachable network element;
   transmitting the registration of the transmitter and the registration of the receiver to the intermediate network element by the first reachable network element and second reachable network element, respectively; and
   reserving, by the intermediate network element, a path between the first reachable network element and the second reachable network element based on the stored registration of the transmitter and the stored registration of the receiver.

2. The method of claim 1, wherein all information required for the reserving is stored in a database in the intermediate network element, and
   wherein there is a central database and, for each port of the network element, respective port databases in each case for a transmission direction and a reception direction.

3. The method of claim 1, further comprising transmitting, by the receiver, first information about a position of the receiver in the Listener Ready message, such that the path reservation is operable to perform a path setup using second information in relation to a position of the transmitter in the network.

4. The method of claim 1, wherein further information is contained in the Talker Advertise message, the Listener Ready message, or the Talker Advertise message and the Listener Ready message about a latency time.

5. The method of claim 4, wherein the path is reserved based on stored accumulated information about the latency time.

6. The method of claim 2, wherein the receiver is operable to register with the intermediate network element with a stream such that further data is received from the intermediate network element.

7. The method of claim 6, wherein the receiver is operable to register with the intermediate network element with the stream, such that further registered data is received from the intermediate network element.

8. A device for guiding a stream along a reserved path in a network based on the Time-Sensitive Networking standard in accordance with IEEE 802.1, wherein a reservation procedure to create a path in the network is performed in a modular manner, the device being configured to:

transmit, in a Talker Advertise message by a transmitter, registration of the transmitter only to a first reachable network element of the network, and store the registration of the transmitter at the first reachable network element;

transmit, in a Listener Ready message by a receiver, a registration of the receiver only to a second reachable network element, and store the registration of the receiver at the second reachable network element;

transmit the registration of the transmitter and the registration of the receiver to an intermediate network element by the first reachable network element and second reachable network element, respectively; and reserve, by the intermediate network element, a path between the first reachable network element and the second reachable network element based on the stored registration of the transmitter and the stored registration of the receiver.

9. The method of claim 2, further comprising transmitting, by the receiver, first information about a position of the receiver in the Listener Ready message, such that the path reservation is operable to perform a path setup using second information in relation to a position of the transmitter in the network.

10. The method of claim 3, wherein further information is contained in the Talker Advertise message, the Listener Ready message, or the Talker Advertise message and the Listener Ready message about a latency time.

11. The method of claim 10, wherein the path is reserved based on stored accumulated information about the latency time.

12. The method of claim 9, wherein the receiver is operable to register with the intermediate network element with a stream such that further data is received from the intermediate network element.

13. The method of claim 12, wherein the receiver is operable to register with the intermediate network element with the stream, such that further registered data is received from the intermediate network element.

\* \* \* \* \*